United States Patent [19]

Haller

[11] 4,156,962
[45] Jun. 5, 1979

[54] TOOL CHANGING INSTALLATION FOR AUTOMATIC MACHINE-TOOL

[75] Inventor: Friedrich Haller, Bietigheim-Bissingen, Fed. Rep. of Germany

[73] Assignee: Dixi S.A. Usine 2, Neuchatel, Switzerland

[21] Appl. No.: 782,628

[22] Filed: Mar. 30, 1977

[30] Foreign Application Priority Data

Apr. 7, 1976 [CH] Switzerland .................. 4336/76

[51] Int. Cl.² ............................................ B23Q 3/157
[52] U.S. Cl. .................................................... 29/568
[58] Field of Search ............ 29/568, 26 A; 214/1 BB, 214/1 BC, 1 BD; 211/1.5

[56] References Cited

U.S. PATENT DOCUMENTS

| | | | |
|---|---|---|---|
| 3,546,774 | 12/1970 | Stöferk et al. ...................... | 29/568 |
| 3,851,380 | 12/1974 | Kurimoto et al. .................. | 29/568 |
| 4,012,830 | 3/1977 | Ewertowski ........................ | 29/568 |

*Primary Examiner*—Gil Weidenfeld
*Attorney, Agent, or Firm*—Silverman, Cass & Singer, Ltd.

[57] ABSTRACT

A tool changing installation for an automatic machine-tool including a tool magazine having a plurality of independently rotatable drums coaxially aligned. Each drum includes a large radial recess opening on its periphery and a plurality of tools angularly disposed around the periphery thereof. A tool transporting carriage moves parallel with the axis of the drums to selectively remove and replace the tools in the drums. A tool being removed or replaced passes on the transporting carriage through the recesses of the other drums to or from a tool loader. The tool loader takes the tools from the transporting carriage and loads them in the machine-tool and removes tools from the machine-tool and loads them in the transporting carriage to be replaced in the drums.

10 Claims, 5 Drawing Figures

TOOL CHANGING INSTALLATION FOR AUTOMATIC MACHINE-TOOL

The present invention relates to a tool changing installation for an automatic machine-tool, comprising a tool magazine and a transportation mechanism transporting the tools to the machine and bringing them back to the magazine.

One of the difficulties encountered with the installations of the above mentioned type lies in the cumbersomeness of the magazine which can become prohibitive because of the number of tools it must be able to contain.

The object of the present invention is to furnish such an installation, the magazine of which contains a great number of tools in a relatively small volume.

The installation according to the invention is characterized by the fact that its magazine includes a plurality of rotatable coaxial drums on which the tools are angularly distributed. Each of the drums is provided with a radial recess opening on its periphery which provides passage for a tool to move therethrough, gripped by a gripping member of the transportation mechanism. The gripping member moves parallel to the axis of the drums causing, during its displacements, each tool it carries to pass successively through recesses in the drums. Each of the recesses being then aligned on one another.

The drawing shows, by way of example, one embodiment of the object of the invention.

The automatic machine-tool, partially represented, is generally designated by 1. The machine-tool 1 includes a headstock 2 in which rotates a spindle 3, the nose 3a of which is intended to receive rotatable cutting tools. The machine-tool 1 is provided with a tool changing installation which includes a magazine generally designated by 4, a transportation mechanism of the tools generally designated by 5, and a loading and unloading mechanism generally designated by 6.

Figure 3:
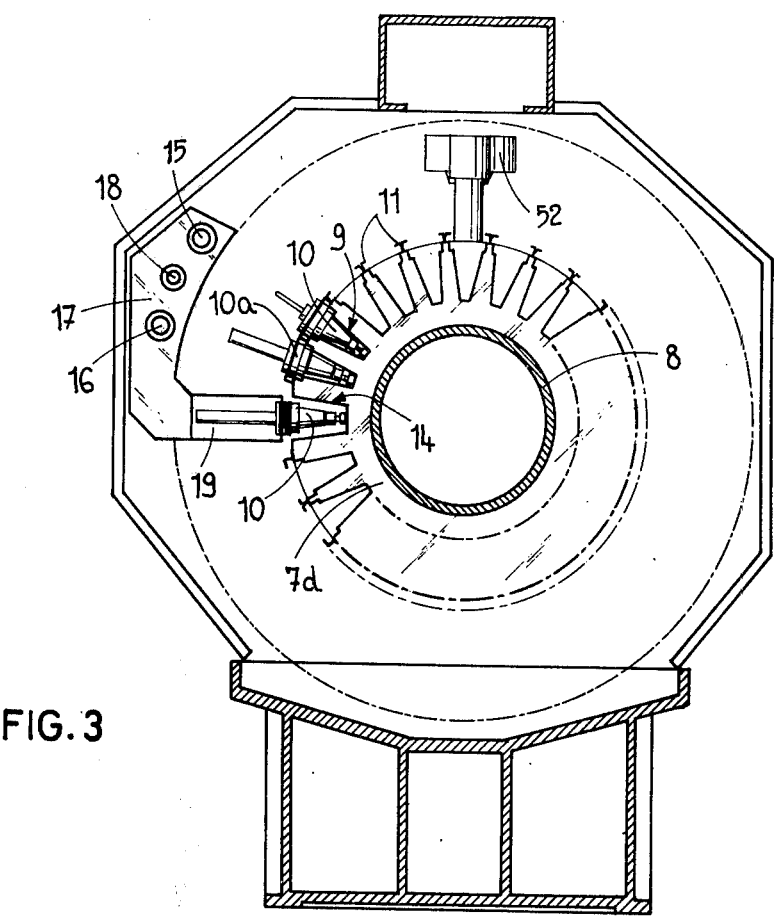
FIG. 3 is a sectional view along line III—III of FIG. 2.
Figure 4:
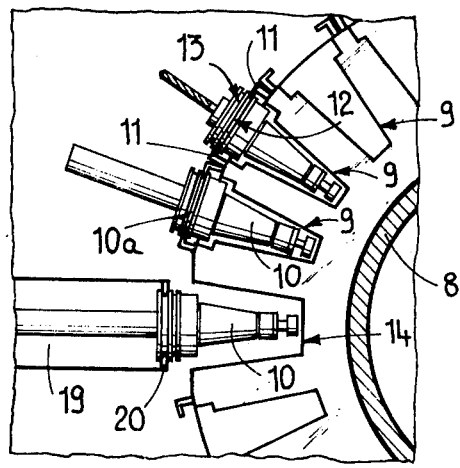
FIG. 4 is a view of a detail of FIG. 3, at a larger scale.

The magazine 4 includes six drums 7a to 7f rotatably mounted on a stationary tubular shaft 8 (FIGS. 3 and 4). The shaft 8 includes hydraulic control means, disclosed hereafter, for rotating the drums separately. Radial notches 9 are provided in the drums to receive the cones 10 of the tools to support the tools individually in the drums.

Each drum carries, on both sides of each notch 9, two small strips 11, of L-shaped crossed section. Each of the strips 11 extends from the drum with the free ends of each pair of L-shaped strips extending substantially toward one another. The space between the free ends provides an opening over the notch 9 which is substantially parallel to the axis of the shaft 8. The free ends of each pair of strips 11 engage one groove 12 of the two annular grooves 12 and 13 provided in a shoulder of a collar 10a of each tool. These small strips 11 thus maintain radially the tools in the notches 9, preventing them from escaping therefrom during the rotation of the drums.

The drums carry also radial fingers (not shown) formed on the outer ends of rods 42 (FIG. 5) which are movable longitudinally. There are two fingers for each notch which engage longitudinal holes (not shown) provided in the collars 10a of the tools. The engagement of the fingers in the collar holes of the tools prevents the tools from rotating on themselves and from moving parallel to the axis of the shaft 8 along the small strips 11.

Each drum is moreover provided with a radial recess 14 the dimensions of which are larger than the notches 9, the purpose of which will be indicated hereafter.

Figure 1:
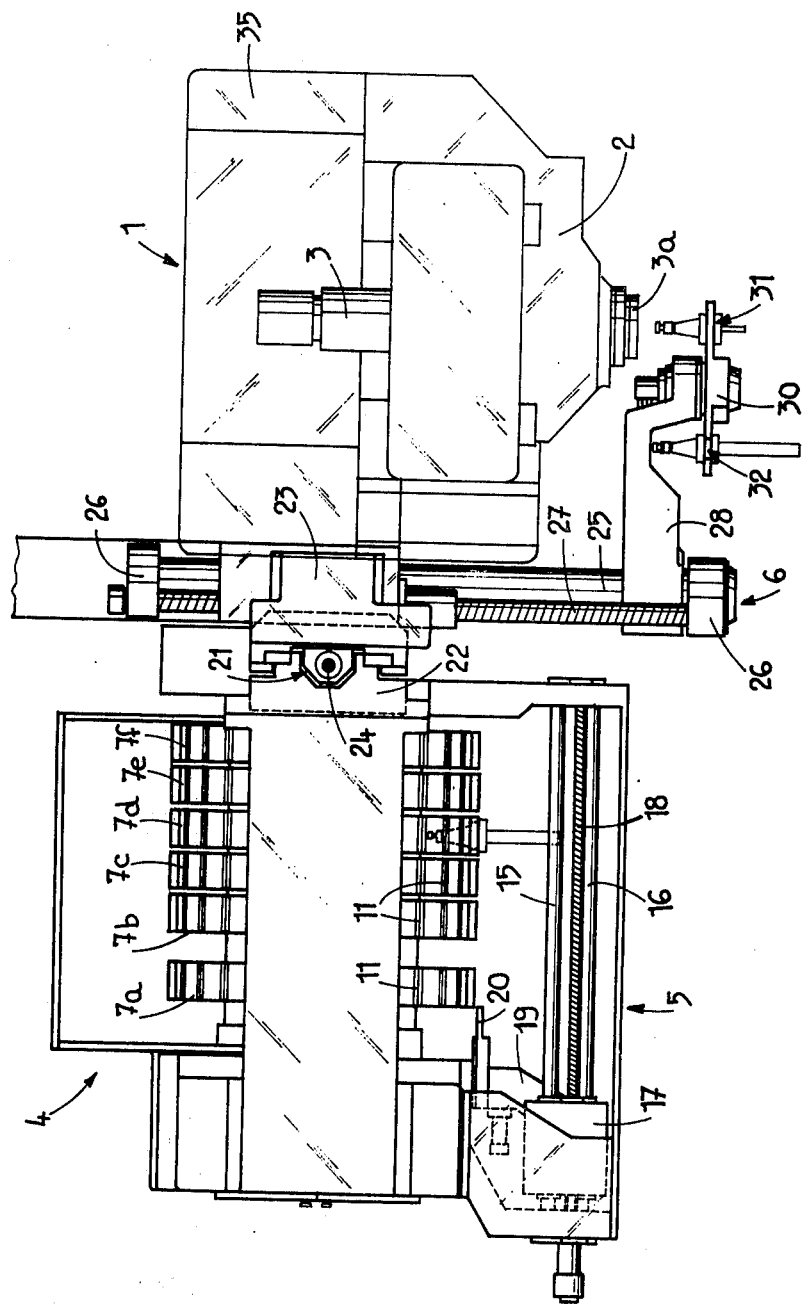
FIG. 1 is a plan view of a part of an automatic machine-tool provided with a tool changing installation.

The transportation device or mechanism 5 includes two guiding rods or elements 15 and 16 parallel to the axis of the drums, on which moves a carriage 17 driven by a lead-screw 18. This carriage carries an arm 19 extending from the carriage 17 toward the drums which is provided with a grip 20 having a pair of branches or arms (FIGS. 1 and 4). The branches of the grip 20 are hydraulically controlled to engage into diametrically opposed notches or grooves 13 (FIG. 4) provided in the collars of the tools on the drums.

During the operation of the installation, all the drums occupy a position called "zero" in which their recesses 14 are situated or aligned opposite the grip 20, except for one of them. For example, in the case represented in the drawing, the drum 7d has an angular position which is such that the tool supported therein which is to be transported to the machine-tool is situated or aligned opposite the grip 20. During the longidutinal movements of this grip, parallel to the axis of the drums, the grip 20 engages into the notches of the tool it finds on its trajectory. The grip 20 drives the engaged tool with itself while sliding the tool along the small maintaining strips 11 to release the tool from the free ends of the strips 11. The maintaining or stop fingers having been, in the meantime, radially moved to release the tool to move parallel to the shaft 8. During this movement, the tool gripped by the grip 20 passes through the recesses 14 of the drums it has to pass to be extracted from the magazine 4 and moved to the loading and unloading mechanism 6.

The loading and unloading mechanism 6 includes a vertical guiding element 21, provided on the frame 22 of the magazine 4, on which moves a carriage 23 driven by a lead-screw 24. The carriage 23 carries, arranged to move longitudinally or horizontally thereon, a horizontal bar 25 which is connected, by two yokes 26, to a lead-screw 27. The bar 25 carries, articulated thereon at one of its ends, an oscillating arm 28. The arm 28 carries articulated at 29 at its end, a rocking element 30 which is provided at its ends with two grips 31 and 32.

Figure 2:
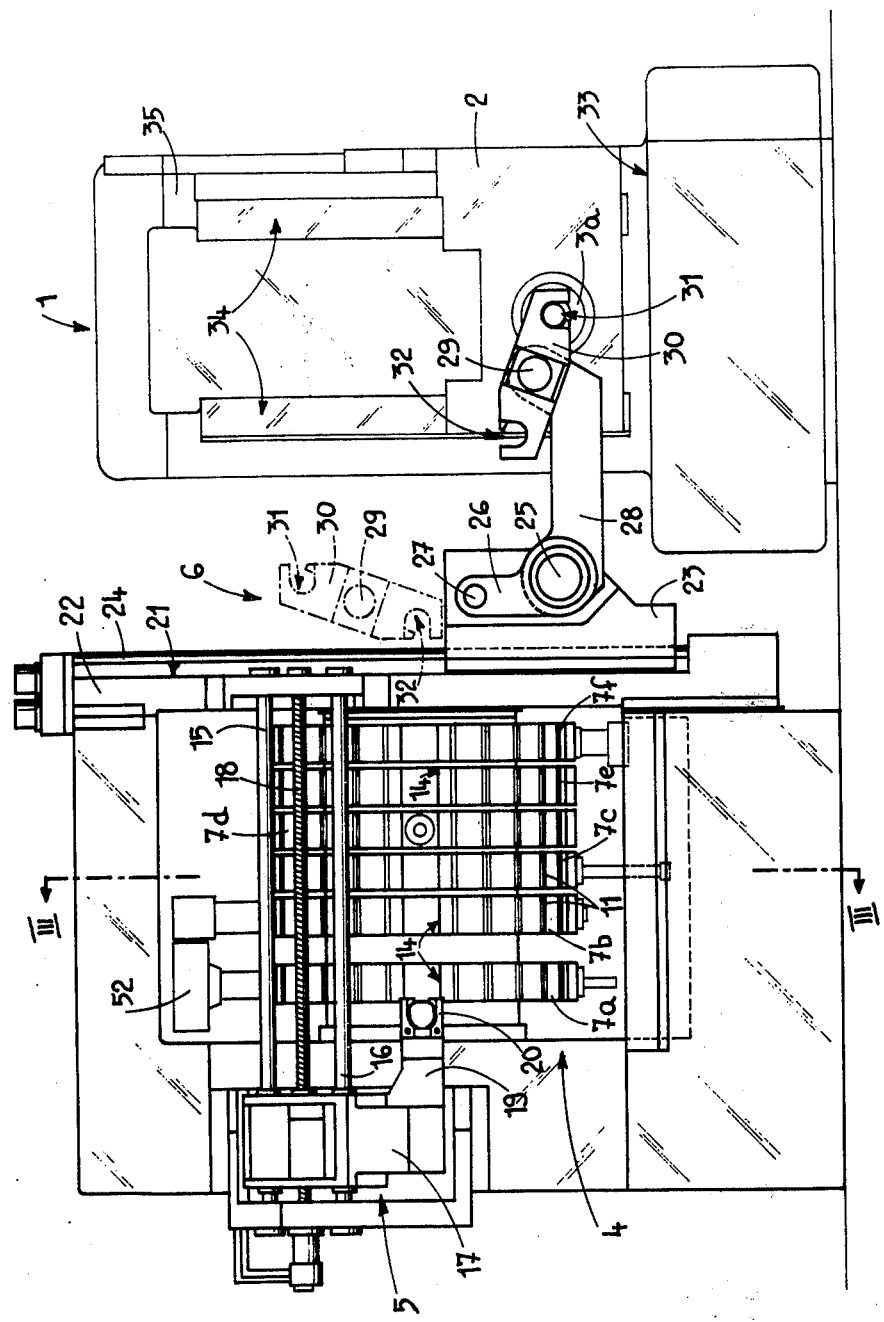
FIG. 2 is an elevational view of FIG. 1.

When the oscillating arm 28 is vertical, the rocking element 30 occupies the position represented in dot-and-dash lines in FIG. 2 in which one of its grips 31 and 32, for instance the grip 32, is situated opposite the grip 20 of the transportation device. The grip 20 is moved toward the arm 28 such that the tool carried by this grip engages, by its annular groove 13, the grip of the rocking element 30. The grip 20 is then moved slightly back to place it in a waiting position. The arm 28 is then moved forward in a movement of translation until the rocking element 30 is at the height of the nose 3a of the spindle (FIG. 2). The arm 28 is again moved down at the same time as the rocking element 30 rotates in the clockwise direction, bringing its other grip, in the present case the grip 31, to engage into the groove 13 of the tool situated in the spindle 3 of the machine. The bar 25 is then moved longitudinally, extracting the tool from the spindle 3. The rocking element 30 then is rotated 180° in the clockwise direction, so that the chips which could be carried by the tool fall then on the bed 33 of the machine without encountering any movable element thereof and the tool carried by the grip 32 of the rocking element 30 is rotated into alignment with the axis of the spindle. A return movement of the bar 25 brings then the tool carried by the grip 32 into the spindle 3 of the machine. Then the arm 28 is rotated upwardly which releases the rocking element 30 from the tool once it is in place in the spindle. The rotation of the arm 28 brings the tool previously used, which is then in the grip 31, back to the upper position. The arm 28 is again operated in a movement of translation for bringing back the tool into the plane of the grip 20 which is then moved forward and grips the tool for bringing it back to one of the drums of the magazine.

Depending upon the height at which the spindle 3 is located, the headstock 2 of which can move along a vertical guiding element 34 provided on the frame 35 of the machine, the process of loading and of unloading may include a vertical movement of the carriage 23 along the guiding element 21.

Figure 5:
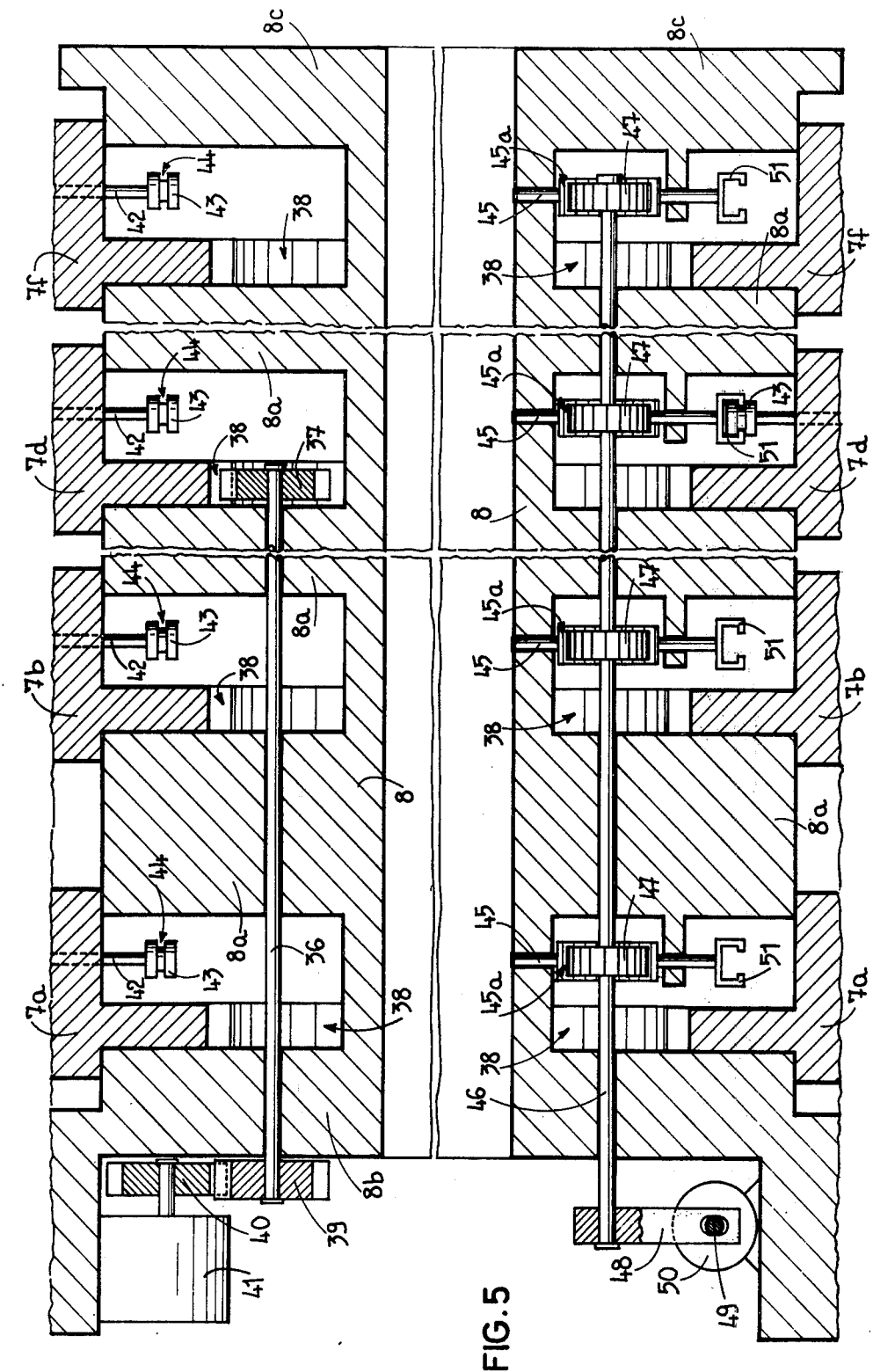
FIG. 5 is a diagrammatic axial sectional view of a detail of FIG. 1.

FIG. 5 illustrates, diagrammatically represented, the driving means of the drums as well as the means ensuring the movement of the radial stop fingers maintaining in position the tools on the drums.

The stationary support 8 of the drums has been disclosed and represented previously as being a mere tubular shaft while, in the reality, it shows a set of outer shoulders 8a, the end shoulders constituting flanges 8b and 8c. The whole has been represented in FIG. 5 as constituting a unitary member while, in the reality, the stationary support 8 is made of several juxtaposed elements maintained assembled by longitudinal braces.

The shoulders 8a are traversed by several longitudinal shafts 36, of different lengths, arranged in different planes, and of which only one is visible in FIG. 5. These shafts 36 carry, at their inner end, each a pinion 37 meshing with an inner toothing 38 provided on each drum 7. These several shafts 36 pass through the end-flange 8b of the stationary support 8 and carry each, at their outer end, a pinion 39 meshing with a pinion 40 driven by an hydraulic motor 41 secured to the said flange 8b. The gearing ratio is such that a fifth of a revolution of pinion 39 provides an advance of one step of the corresponding drum 7 to position each notch 9 and its corresponding tool in alignment with the grip 20 to remove or replace the tool. The gearing allows the indexing of the several drums by means of the several pinions 39.

So far as the control means of the stop fingers of the tools are concerned, they comprise rods 42 the outer end of each of which, not represented, constitute one of the said stop fingers, each rod 42 being mounted in such a way as to be able to slide radially on one of the drums 7. Each of these rods 42 at its inner end is ended by a head 43 in which is provided an annular groove 44.

The stationary support 8 of the drums carries a set of radial sliding rods 45 showing each a portion 45a provided with a toothing constituting a toothed-rack. This support carries a longitudinal shaft 46, extending along its entire length, and which is provided with as many pinions 47 as there are drums, each of these pinions meshing with one of the toothed-racks 45a. The shaft 46 passes through the flange 8b of the support 8 and carries, at its outer end, a rocking lever 48. The lever 48 is rocked or pivoted through the intermediary of a tie-rod 49, by a pilot-cylinder 50 carried by the said flange.

Each rod 45 carries, at its outer end, a gripping member 51 which engages, during the rotation of the drums, the heads 43 of the rods 42 by the grooves 44. The position of the shaft 46 on the support 8 is such that, when the drums occupy their position "zero", their notches 14 are situated opposite grips 51 of the rods 45. Hence, when the shaft 46 is driven by the longitudinal movement of the pilot-cylinder 50 only the one rod 45 situated opposite the one drum which does not occupy its position "zero" is moved by its grip 51 being engaged in the head 43 of the rod 42 of this drum. The other grips 51 move loosely in the recesses or notches 14, no head 43 being engaged therein. On the other hand, the one drum which does not occupy its position "zero" has its rod 45 driven by the shaft 46 so as to be eclipsed or moved inwardly to release the tool of this drum so it may be moved by the grip 20. The tool then may be put into place, or may be pulled out. The rod 42 being pushed outward engages by its stop fingers to retain the tool once this latter is in place on the drum.

It is to be noted that the drum 7a is situated at a distance from the drum 7b slightly greater than the distance separating the other drums one from another. This provides a location for larger or more cumbersome tools, i.e. of greater diameter, such as tool 52 of FIGS. 2 and 3, than the standard diameter. The larger tool 52 may have a diameter greater than 300 mm while the standard diameter is 150 mm. In this case, it will obviously be necessary to sacrifice space for the stations of the drums 7a situated on both sides of the tool of great diameter to allow room for the larger tool.

In the case of drums of 1200 mm of diameter, one could provide twenty-four individual tool stations on each of the six drums, so that the whole magazine 4 will be able to contain 144 tools of standard dimensions in a reduced compact space.

It is to be noted that the installation operates by means of a tool coding, and not of a place coding. However, to prevent the selecting device from searching in every location in each drum for each requested tool; an electronic memory will be provided to record from the tool coding which tool is located in each of the stations. One has thus a momentarily place coding, permanently up to date, which permits that only the drum carrying the desired tool be driven in rotation and that this drum be directly brought into the angular position in which the desired tool is situated opposite the rectilinear trajectory of the grip 20.

When a tool is put again in place in the magazine, except if it is matter of a tool of great dimension, which has to be located on the drum 7a, this tool merely takes the place of the tool which has just been taken away, without it being necessary to bring any predetermined drum in the position able to receive the tool coming from the rocking element 30.

This arrangement combines both the advantages of the tool coding and of the place coding.

What I claim is:

1. An improved tool changing installation for an automatic machine-tool, including a tool magazine and a transporting mechanism for removing the tools from the machine and replacing them in the magazine, the improvement comprising:

said magazine including a plurality of rotatable coaxial drums including means for rotating said drums independently from one another, said tools being angularly distributed around the periphery of each drum, each drum being provided with a radial recess opening on its periphery larger than the width of said tools to allow movement of a tool therethrough;

said transporting mechanism including gripping means movable on an axis substantially parallel with the axis of said drums for removing and replacing tools in said drums, said gripping means carrying a tool aligned such that it will pass through said recess openings in the other drums as it is moved past said drums.

2. An improved tool changing installation as claimed in claim 1 wherein:

said transporting mechanism includes a guiding element extending parallel to the axis of said drums, said transporting mechanism including a carriage which moves on said guiding element and carries said gripping means.

3. An improved tool changing installation as claimed in claim 1 further including:

said drums being carried on a stationary support;

said means for independently rotating said drums including a plurality of longitudinal shafts carried by said stationary support, one for each of said drums, each of said shafts being independently driven and of a length to terminate adjacent its respective drum and including means carried on the end of said shaft for rotating its corresponding drum.

4. An improved tool changing installation as claimed in claim 3 further comprising:

said drive means being a pinion mounted on the end of each shaft meshing with an inner toothing on each drum, including a gear ratio between each of said pinions and the inner toothing of the corresponding drum such that one step of advance of the drum corresponds to a fixed portion of revolution of the shaft so that the shaft can be used as an indexing means for its corresponding drum.

5. An improved tool changing installation as claimed in claim 1 wherein:

said tools are arranged radially on each of said drums of the magazine and partially disposed in radial notches provided in each of said drums.

6. An improved tool changing installation as claimed in claim 5 wherein:

at least one of the end drums is spaced at a distance from the adjacent drum greater than the distance between each of the other drums one from another, so as to permit tools of a greater dimension that the tools distributed on the other drums to be placed on the said end drum.

7. An improved tool changing installation as claimed in claim 5 wherein:

each of said tools includes at least one annular groove;

each drum includes on its lateral face pairs of small strips for maintaining the tools, each pair of strips being arranged one on opposite sides of each notch into which said tools are disposed, each of said strips extending parallel to the axis of the drums such that a tool engaged in a notch of a drum will be engaged by its annular groove with the pair of small strips to prevent any radial movement of the tool from the drum and notch in which it is located.

8. An improved tool changing installation as claimed in claim 7 wherein:

each of said tools includes a shoulder having a notch therethrough parallel to the axis of the tool;

each drum carrying radially arranged fingers movable longitudinally, each of the fingers situated adjacent one of the notches receiving the tools and moving longitudinally to engage said notch in the shoulder of the tool for preventing the tool from rotating around its axis when it is located in the notch on the drum or from moving laterally with respect to said strips.

9. An improved tool changing installation as claimed in claim 8 wherein:

said radial fingers include radial rods extending toward the center of each drum, the end of each rod including a head provided with an annular groove, a control mechanism for displacing the fingers radially including a longitudinal shaft carried by a stationary support onto which said drums are mounted, the shaft provided with pinions meshing with tooth racks movable radially and connected to gripping members to engage the annular grooves of said rods, the position of the gripping members being such that when the drums occupy a first position, they have their radial recesses situated opposite said gripping members, so that only a drum which is not occupying its first position has its radial rods situated opposite the corresponding gripping member which will engage the rod to remove or replace the tool in the corresponding location in the drum.

10. An improved tool changing installation as claimed in claim 7 wherein:

each of said tools include at least a second annular groove parallel to said first annular groove, said strips engaging a first one of said grooves and said gripping member gripping the tool by the second one of said grooves for displacing the tool laterally from the drum between the small strips.

* * * * *